Oct. 8, 1957  E. L. SHARP  2,808,675
FISHING REEL LOCKING DEVICE
Filed Sept. 6, 1955

EWING L. SHARP,
INVENTOR,

BY
ATTORNEY

United States Patent Office 2,808,675
Patented Oct. 8, 1957

2,808,675

FISHING REEL LOCKING DEVICE

Ewing L. Sharp, Beverly Hills, Calif.

Application September 6, 1955, Serial No. 532,710

1 Claim. (Cl. 43—22)

This invention relate s to fishing reels and has particular reference to means for locking the reel against displacement on the fishing rod once it has been placed in position thereon.

Many different types of reel locking devices have been made but such devices as have come to my notice are quite complicateed, including several specially designed parts and depending upon screws or bolts to clamp the parts together. Other devices are made from metal and rubber parts integrally combined in specially designed molds and quite expensive.

It is the object of the present invention to provide a reel locking device composed of two extremely simple, identically shaped metal elements and a simple rubber band. Another object is to provide such simple device in which the band may be manually attached to the elements by anyone and as readily applied to reels such as ordinarily used effectively to lock the reel in position on the rod.

The novel features as well as the advantages of the device will appear upon perusal of the following detailed description and by referring to the accompanying drawings in which a preferred form of the invention is illustrated.

Figure 1:
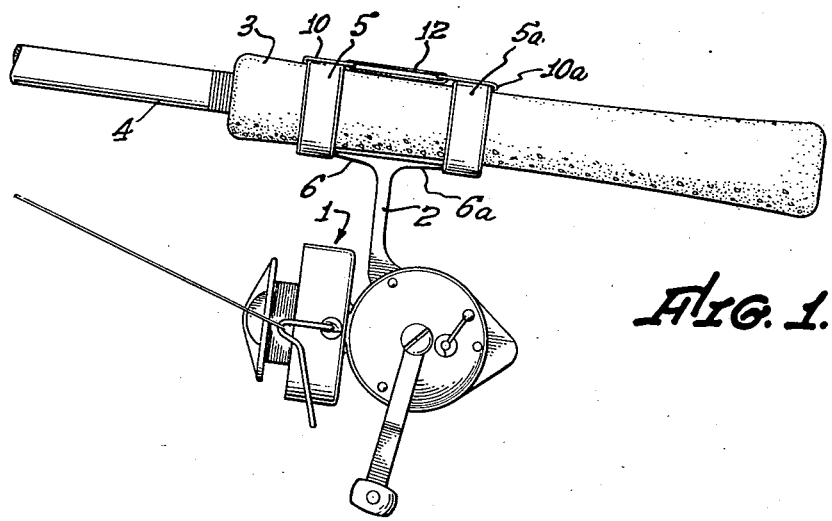
Fig. 1 is a side elevational view of a fishing rod and reel held locked together by the device of the invention.

Spinning reels as commonly used at the present time include a reel body 1 and the base portion 2 of the body is shaped fittingly to seat on the reel supporting handle portion 3 of a fishing rod 4. A pair of sleeves 5, 5ª are loosely mounted on the handle and they are pushed onto the slightly tapered ends 6, 6ª of the base rigidly to maintain the reel in position on the handle.

Figure 2:
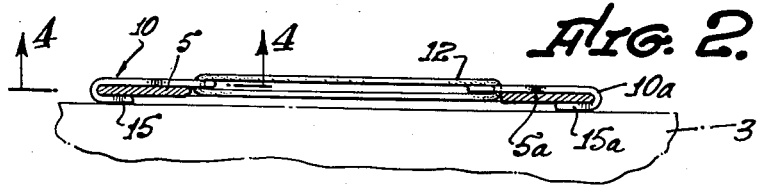
Fig. 2 is an enlarged, fragmentary view of the upper portion of Fig. 1.

The device of the invention consists of a pair of hook-shaped elements 10, 10ª, the inner ends of which are recessed to provide a wide space between the prongs thereof. The prongs are inwardly directed to form transversely alined fingers 13, 14 the adjacent ends of which provide a centrally positioned slit 11 in the element. An ordinary rubber band 12 is then pushed through the slits of the elements whereupon the hooks of the elements are slipped over the outer edges of the sleeves 10, 10ª to assume the position indicated in Figs. 1 and 2 of the drawings. The elements are exactly alike and they are preferably made from sheet metal of sufficient strength and resilience to permit the adjacent, or abutting ends 13, 14 of the elements to be manually swung apart laterally to provide an opening for the insertion of the rubber band into the elements without danger of injuring the material of the band.

A resilient strap is in this manner provided, the hooks 15, 15ª of which may be manually slipped over the outer edges of the sleeves securely to maintain the sleeves in reel base engaging position while the rod and reel are in use.

Figure 3:
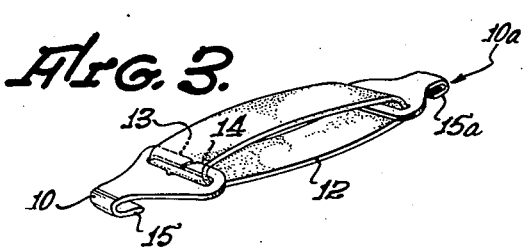
Fig. 3 shows the device of the invention as it appears before it is applied to the rod and reel.
Figure 5:
Fig. 5 illustrates a somewhat modified form of the invention.
Figure 4:
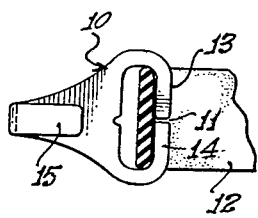
Fig. 4 is a detailed view of one end of the device.

The elements are in Figs. 3 and 4 shown stamped out of thin sheet metal which is bent to form the hooks 15, 15ª of the proper shape snugly to engage the edges of the sleeves. However, it may be found preferable to bend a piece of wire of the proper strength and resilience to form the element 20 shown in Fig. 5 of the drawings. In general outline, this modified element, as well as the hook 21 thereof, may remain substantially like the element 10 and is assembled with the band 12 and is operable in like manner to produce the strap of my invention.

It is seen from the foregoing description that I have provided a reel retaining device consisting of a very simple and inexpensive hook element, two of which are used, and an ordinary rubber band. It also is important to note that these are separate parts which may be manually assembled by anyone without having to resort to special tools for this purpose. Should the rubber band wear out or accidentally become torn apart, it is a simple matter to place another band in the elements. But while I have shown and described preferred forms of the invention, it is to be understood that other modifications, within the scope of the claim hereto appended, may be embodied without departing from the spirit of the invention.

I claim:

The combination with the handle of a fishing rod, a reel having a base portion shaped fittingly to engage the handle and a pair of sleeves mountable on the handle for engagement with the ends of the reel base portion; of a strap manually mountable to secure the sleeves in position on the reel base, said strap consisting of two identical locking elements shaped to engage the outer edges of said sleeves, each element being made from resilient material having one end bent to form a hook for engagement with the sleeve edge, the opposite end of the element being recessed to provide projecting prongs the ends of which are inwardly directed to form transversely alined fingers meeting at the center of the element, and an ordinary loop-shaped rubber band, the band being mountable in the recesses of the elements by forcing the adjacent ends of the fingers apart laterally thereby to provide an opening in each element for insertion of the band into the element.

References Cited in the file of this patent

UNITED STATES PATENTS

| | | |
|---|---|---|
| 258,300 | Holland | May 23, 1882 |
| 330,985 | Kopf | Nov. 24, 1885 |
| 1,209,252 | Blatt | Dec. 19, 1916 |
| 1,211,296 | Davis | Jan. 2, 1917 |
| 1,691,810 | Itzerott | Nov. 13, 1928 |
| 2,257,494 | Brown | Sept. 30, 1941 |

FOREIGN PATENTS

| | | |
|---|---|---|
| 252,488 | Switzerland | Oct. 1, 1948 |